United States Patent [19]

Dash et al.

[11] Patent Number: 5,507,149
[45] Date of Patent: Apr. 16, 1996

[54] NONPOROUS LIQUID IMPERMEABLE CRYOGENIC BARRIER

[76] Inventors: J. Gregory Dash, 4542 52d Ave. NE., Seattle, Wash. 98105; Roger J. Leger, 6340 4th Ave. NE., Seattle, Wash. 98115; Ronald K. Krieg, 5459 Tassawwen Loop, Blaine, Wash. 98230

[21] Appl. No.: 358,080
[22] Filed: Dec. 15, 1994
[51] Int. Cl.$^6$ ................................................ F25B 19/00
[52] U.S. Cl. .............................. 62/53.1; 62/260; 165/45; 405/56
[58] Field of Search .................................. 62/45.1, 53.1, 62/260; 165/45; 405/56

[56] References Cited

U.S. PATENT DOCUMENTS

| | | |
|---|---|---|
| 3,183,675 | 5/1965 | Schroeder . |
| 3,267,680 | 8/1966 | Schlumberger . |
| 3,295,328 | 1/1967 | Bishop . |
| 3,344,607 | 10/1967 | Vignovich . |
| 3,354,654 | 11/1967 | Vignovich . |
| 3,407,606 | 10/1968 | Khan et al. ............................... 62/53.1 |
| 4,121,429 | 10/1978 | Grennard ................................. 62/53.1 |
| 4,224,800 | 9/1980 | Grennard ................................. 62/53.1 |
| 4,538,673 | 9/1985 | Partin et al. .............................. 165/45 |
| 4,860,544 | 8/1989 | Krieg et al. ............................... 62/45.1 |
| 4,974,425 | 12/1990 | Krieg et al. ............................... 62/45.1 |
| 5,050,386 | 9/1991 | Krieg et al. ............................... 62/45.1 |
| 5,146,987 | 9/1992 | Krieg ...................................... 166/302 |
| 5,324,137 | 6/1994 | Dash ....................................... 405/128 |

FOREIGN PATENT DOCUMENTS 2321759  11/1974  Germany .

OTHER PUBLICATIONS

Iskandar, I. K., *US Army Corps of Engineers*, Jul. 1986, "Effect of Freezing on the Level of Contaminants in Uncontrolled Hazardous Waste Sites".

Dash, J. G., *Science*, vol. 246, Dec. 1989, "Thermomolecular Pressure in Surface Melting: Motivation for Frost Heave", pp. 1591–1593.

Cary, J. W. et al., *Soil Science Society of America Proceedings*, vol. 36, No. 4, Jul.–Aug. 1972, "Salt and Water Movement in Unsaturated Frozen soil" pp. 549–555.

Gross, G. W. et al., *Journal de Physique*, Mar. 1987, "Recent Experimental Work on Solute Redistribution at the Ice/Water Interface. Implications for Electrical Properties and Interface Processes", pp. 527–529.

Hofmann, L. L. et al., *Proc. Int. Symp.*, Mar. 1990, "Redistribution of Soil Water and Solutes in Fine and Coarse Textured Soils After Freezing", pp. 263–269.

Sullivan, J. M. et al., *Proc. Int. Symp.*, "Comparison of Numerical Simulations with Experimental Data for a Prototype Artificial Ground Freezing", pp. 36–43.

Hallet, B., *Proceedings of Third International Conference on Permafrost*, 1978, "Solute Redistribution in Freezing Ground", pp. 86–91.

*Primary Examiner*—Ronald C. Capossela
*Attorney, Agent, or Firm*—Lappin and Kusmer

[57] ABSTRACT

A method of making a nonporous, substantially liquid-impermeable cryogenic barrier within the Earth, and a nonporuous, substantially liquid-impermeable cryogenic barrier. A triple array of casings extends along respective sets of central axes from arrays of spaced apart locations on the surface of the Earth. A refrigerant is flowed through the two outer arrays of casings to form overlapping, continuous cold columnar regions extending along and about the respective central axes of the casings. The intermediate region between the two outer arrays of casings contains the central array of casings. A heat transtar agent is flowed through a selected subset of casings within the central array of casings to establish a relatively warm region between the continuous cold regions. Water is introduced into the relatively warm region through a second selected subset of casings within the central array of casings at a rate which permits freezing of the water upon entry into, and contact with, the adjacent continuous cold regions. When the relatively warm region is saturated with water, a flow of refrigerant is established in the first selected subset of casings in the central array to freeze the saturated region and form a nonporous, substantially liquid-impermeable barrier.

19 Claims, 7 Drawing Sheets

NONPOROUS LIQUID IMPERMEABLE CRYOGENIC BARRIER

BACKGROUND OF THE DISCLOSURE

This application relates to the field of toxic waste control and more particularly to systems and methods for containing or diverting toxic waste materials stored within the Earth.

Methods and systems for containing toxic waste materials in the Earth are known. For example, U.S. Pat. Nos. 4,860,544 and 4,974,425 to Krieget al. disclose methods and systems for reversibly establishing a flow-impervious cryogenic barrier about a volume within the Earth below a surface region or containment site. The systems include an array of boreholes peripherally established around the containment site and extending down into the Earth about a volume underlying that site. Preferably the boreholes have casings extending therethrough. A refrigerant flow through the boreholes is then established, so that moisture naturally present within the Earth adjacent to the boreholes freezes to form ice columns extending along and about the respective boreholes. The boreholes am spaced and the refrigerant flow controlled so that the adjacent ice columns overlap to form a continuous ice wall, thereby creating a flow-impervious barrier to the migration of contained materials.

Particular problems are encountered in the storage and containment of toxic materials in porous or arid soils within the Earth, such as in volcanic rock or sand. There is relatively little moisture present in such soils, and thus it can be difficult or impossible to establish ice columns or other subterranean frozen regions to assist in the containment or storage of migratory materials.

Krieg et al. discloses, in U.S. Pat. No. 4,974,425, the addition of moisture to porous soil in order to provide sufficient residual water to establish ice columns within the Earth around the refrigerant-containing boreholes. However, the behavior of liquids which are added to porous soils can be difficult to predict and control because there is no convenient or natural way to contain and/or channel such added liquids. As a result, the addition of water to porous soils can, under some circumstances, induce uncontrolled migration of toxic and other materials already present within the soil, potentially causing harm to subterranean aquifers and other structures. Further, environmental legislation has created significant disincentives to introduce a quantity of water into the Earth without providing for its removal and the restoration of the site to its original condition. The addition of water can be sequenced using the techniques of U.S. Pat. No. 4,974,425, particularly with a double barrier, to reduce the danger of added water escaping from the site. However, improvements to such techniques would be very useful.

Accordingly, it is an object of this invention to provide an improved cryogenic barrier system and method for the control and storage of migratory materials within the Earth.

It is another object of the invention to provide an improved cryogenic barrier system and method which effectively prevents the migration of liquids through it.

It is another object of the invention to provide an improved cryogenic barrier system and method which can be reversibly established in the Earth, i.e., which can be readily created and removed.

It is another object of the invention to provide an improved cryogenic barrier system and method which can be created in arid or porous soils.

It is another object of the invention to provide an improved cryogenic barrier system and method which is effective over a long term.

It is another object of the invention to provide an improved cryogenic barrier system and method that is economic and efficient to install and operate.

It is another object of the invention to provide an improved cryogenic barrier system and method that permits integrity monitoring and correction of potential faults or short-term failures before they actually occur.

It is another object of the invention to provide a nonporous, substantially liquid impermeable diverting wall within the Earth for diverting or channeling the migration of materials within the Earth.

These and other advantages will be further detailed in the description and drawings which follow.

SUMMARY OF THE INVENTION

The invention provides a method for reversibly establishing a nonporous, substantially liquid-impermeable cryogenic barrier extending downward from an elongated (curved or straight) surface region of the Earth, the surface region having an axis extending along the long dimension of the surface region. The method and the resulting system are particularly useful in arid soils, i.e., porous regions of the Earth in which there is little or no natural water present. The method and barrier of the invention can be used to contain, for example, hazardous materials within the Earth or to control the subterranean flow of such materials.

According to one form of the invention, a first array of casings is established to extend downward along a first set of central axes from a corresponding first set of spaced apart locations on the surface region. The first set of locations is generally parallel to the axis of the elongated surface region. A second array of casings is established to extend downward along a second set of central axes from a corresponding second set of spaced apart locations on the surface region. The second set of locations is substantially parallel to and spaced apart from the first set of locations. A third array of casings is established to extend downward along a third set of central axes from a corresponding third set of spaced apart locations on the surface region. The third set of locations is between the first and second sets of locations so that the third array of casings is between the first and second arrays of casings. These arrays may be established in any order.

A flow of a heat exchange medium is then established in selected casings as follows: first, a flow of refrigerant is established in the casings of the first and second arrays to cool regions of the Earth surrounding the first and second arrays of casings to a temperature of less than 0 degrees C. This cooling of Earth around the first and second arrays of casings establishes cold columnar regions in the Earth extending axially along and radially about the respective axes of the first and second sets of central axes. The refrigerant flow and the positions of the first and second arrays of casings are selected so that adjacent cold columnar regions in respective arrays overlap to establish corresponding first and second continuous cold regions having a temperature of less than 0 degrees C. The first and second cold regions are opposite each other and on either side of the third array of casings. Second, a flow of a heat transtar agent is established in a first selected subset of the casings of the third array, whereby regions of the Earth surrounding the third array of casings are at a temperature in excess of 0 degrees C., thus establishing relatively warm columnar regions in the Earth extending axially along and radially about the axes of the third set of central axes. The flow of the heat transfer agent and the positions of the third array of casings and of the first selected subset of casings of the third array are selected so that adjacent warm columnar regions in the third array overlap to establish a corresponding continuous warm intermediate region extending between the first and second continuous cold regions.

Water is then introduced into a second selected subset of casings of the third array. Preferably, the casings of second subset are perforated, or at least porous to water, so that the water escapes to the region between the first and second cold regions. At least a portion of the water introduced to those porous casings enters the first and second continuous cold regions and freezes therein to establish corresponding first and second nonporous, substantially liquid-impermeable walls on respective sides of the continuous warm region. Sufficient water is introduced at a suitable rate to fill that continuous warm region, eventually saturating the continuous warm region with water. Finally, a flow of refrigerant is established in the first selected subset of the third array of casings, whereby unfrozen water in the continuous warm region freezes to form a nonporous, substantially liquid-impermeable barrier.

In an alternative embodiment of the invention, the first, second and third sets of central axes $X_1$, $X_2$ and $X_3$ converge at a predetermined point beneath the Earth's surface.

In the preferred embodiment of the invention, the spacing D between the respective arrays of casings is substantially greater than the spacing d between individual casings in a given array.

In still another embodiment of the invention, the casings include means for removing water from within the Earth.

In yet another embodiment of the invention, the axis of the elongated surface region is a closed axis (i.e., a curvilinear axis whose endpoints meet). The cold regions which extend about the first and second arrays of casings located along such a closed axis intersect within the Earth to provide an enclosed region interior to the first and second sets of spaced apart locations on the surface region.

In yet another embodiment of the invention, the cold regions extend downward to a liquid-impervious layer within the Earth. In the event that the liquid-impervious layer near the cold regions is other than perpendicular to the direction of the local gravitational force on the Earth, the cold regions can intersect the liquid-impervious layer to form a collection zone for the pooling of migratory streams within the Earth.

According to yet another aspect of the invention, a nonporous, substantially liquid-impermeable cryogenic barrier extending downward from an elongated surface region of the Earth comprises a first continuous cold region extending downward from a corresponding first set of spaced apart locations on the surface region, a second continuous cold region extending downward from a corresponding second set of spaced apart locations, the second set of locations being substantially parallel to and spaced apart from the first set of locations, and an intermediate region extending downward from a corresponding third set of spaced apart locations on the surface region. The third set of locations is between the first and second sets of locations, and the intermediate region extends between the first and second continuous cold regions. The first and second continuous cold regions are opposite each other and are disposed on respective sides of the intermediate region. At least a portion of the first and second continuous cold regions overlap. The first and second continuous cold regions include means for establishing a flow of a refrigerant therein to cool the first and second continuous cold regions to a temperature of less than 0 degrees C. so as to freeze any liquids present therein. The intermediate region includes means for establishing a flow of a heat transfer agent in first selected portions of the intermediate region to warm the intermediate region to a temperature in excess of 0 degrees C. to create a continuous warm region extending between the first and second continuous cold regions. The intermediate region further includes means for establishing a flow of water in second selected portions of the intermediate region. At least a portion of the water entering the first and second continuous cold regions freezes, thereby establishing frozen regions on respective sides of the continuous warm region. The continuous warm region is thus saturated with water. The intermediate region further includes means for establishing a flow of a refrigerant in the water-saturated continuous warm region to cool the water-saturated region to a temperature of less than 0 degrees C. to freeze the water therein.

The means for establishing the flow of refrigerant in the first and second continuous cold regions comprises first and second arrays of casings extending downward along respective first and second sets of central axes from corresponding first and second sets of spaced apart locations on the surface region. The means for establishing the flow of heat transfer agent in the first selected portions of the intermediate region, and the means for establishing the flow of water in the second selected portions of the intermediate region, comprise a third array of casings extending downward along a corresponding third set of central axes from a third set of spaced apart locations on the surface region.

The cryogenic barrier of the present invention can be used to construct a closed containment system beneath the surface of the Earth. Additionally or alternatively, it can be used to construct subterranean walls or channels for the diversion and/or flow control of migratory streams within the Earth.

BRIEF DESCRIPTION OF THE DRAWINGS

The foregoing and other objects of the invention, the various features thereof, as well as the invention itself, may be more fully understood from the following description, when read with the accompanying drawings in which.

DETAILED DESCRIPTION OF THE INVENTION

A nonporous, substantially liquid-impermeable cryogenic barrier can be reversibly constructed in arid soil within the Earth according to the method of the present invention. The method involves the use of multiple arrays of boreholes (and, generally, casings within the respective boreholes) extending into the Earth from spaced apart locations along a surface region. Each borehole or casing acts as a conduit for the transport of either a heat exchange medium, or water, or both, through regions of the Earth which are to become part of the barrier system.

In accordance with one form of the invention, three sets or arrays of pipes or casings extend into the Earth along substantially parallel planes from a surface region of the Earth, forming a "triple array". The triple array of pipes or casings forms the basis for a "wall." The first array of casings is herein referred to as an "inner" array, for reasons which will become more apparent in connection with the detailed description of the invention and the drawings which follow. Similarly, the second array of casings is herein referred to as an "outer" array, and the third array of casings is herein referred to as a "central" array. Additional walls can be constructed to intersect the first wall at various angles and depths below the surface region of the Earth. This combination of walls can be arranged to form an intersecting subterranean structure which can surround a designated subterranean volume. Alternatively, the subterranean structure can form a barrier wall which diverts or channels subterranean migratory flows. The spacing D between the substantially parallel walls of the structure is preferably substantially greater than the spacing d between the casings within a single array. This condition assures that the inner and outer portions of the structure can be completely frozen while the central region can remain at a temperature above zero. A flow of a heat exchange medium is established in the casings such that the inner and outer arrays are cooled to a temperature below zero degrees C. to tom a continuous region of subzero temperature along and adjacent to planes of the inner and outer arrays. At the same time, the central array is warmed to a temperature in excess of zero degrees C. to form a continuous warm region along the central plane and between the subzero outer planes. A controlled flow of water is then introduced into the central region via casings in the central array or from the surface region above the central region. The water freezes upon contact with the subzero inner and outer cooled regions while remaining unfrozen in the central region. The water flow into the central region is continued until that region is saturated with unfrozen water contained between the inner and outer cooled (subzero) regions. A flow of a refrigerant is then established in the central array of casings to cool the central region to subzero temperature to freeze the water therein, thereby creating a substantially liquid-impermeable frozen wall. While in the preferred form of the invention, the inner, central and outer arrays may be mutually parallel, some divergence of those planes is permitted, within the meaning of the term "substantially parallel" used to describe the relative position of those arrays. As the divergence increases, it is more difficult to attain a full freeze of the central region, but that configuration is still within the scope of the invention.

The term "reversibly constructed", as used herein, is intended to mean that the cryogenic barrier can be installed within the Earth according to the method of the invention and can later be completely removed, thus restoring the containment site to its original, pre-barrier condition. The term "subsoil", as used herein, refers to all subterranean matter, including but not limited to soil, sand, rock, and the like. The term "arid soil", as used herein, is intended to mean various dry subsoil, including but not limited to rock, soil, sand, lava and combinations thereof, which is substantially porous and substantially devoid of naturally occurring moisture. The term "borehole", as used herein, refers to a channel, curved or straight, extending into the Earth, and formed by drilling or other conventional means. The term "casing", as used herein, refers to a metal or other durable pipe or tube used as a lining for a borehole into the Earth. Although the terms "borehole" and "casing" may be used interchangeably, it is to be understood that the invention can be practiced by employing boreholes with or without casings. The term "closed axis", as used herein, refers to a central axis of an elongated region, which is curvilinear or otherwise not straight to correspond to the shape of the elongated region, and which has endpoints that meet to form an interior region within the confines of the closed axis. The term "warm", as used herein, refers to temperatures generally in excess of 0 degrees C.

Figure 1:
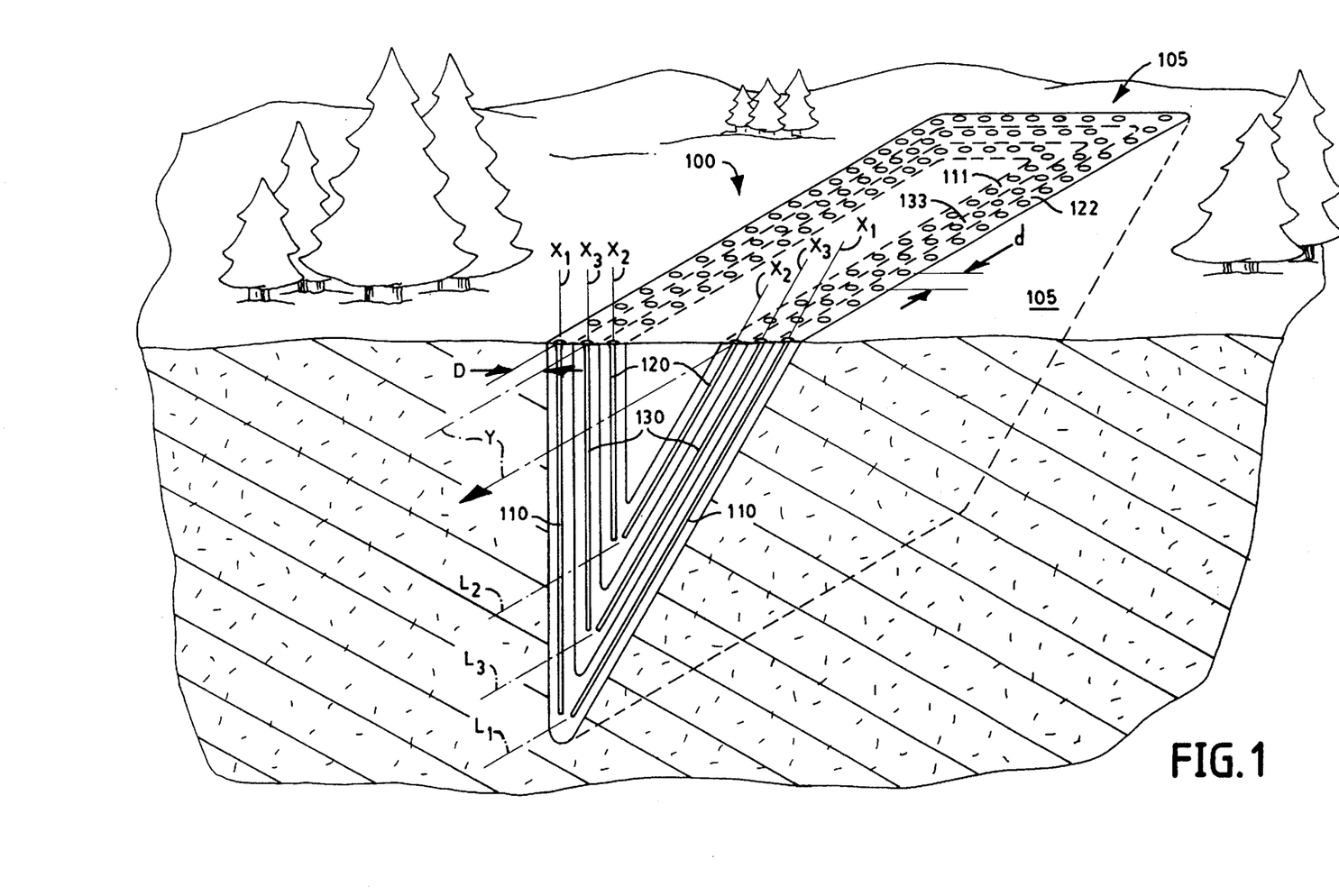
FIG. 1 is a cross-sectional cutaway view of a portion of a cryogenic barrier established according to the method of the present invention.

The construction of a cryogenic barrier according to the method of the invention is illustrated in FIG. 1. The barrier 100 is constructed of multiple rows (or arrays) 111,122, 133 of casings 110, 120, 130, each of which extends down into the Earth along respective sets of central axes $X_1$, $X_2$ and $X_3$ from spaced apart locations on a surface region 105 of the Earth. In FIG. 1, each array consists of casings extending from the respective curvilinear rows of dots in region 105; only the end casings 110, 120, and 130 of the respective arrays are illustrated in that Figure. The surface region 105 is typically an elongated area which overlies a barrier constructed in accordance with the invention. The surface region 105 may extend along a linear or curvilinear (open or closed) central axis Y, which is U-shaped in the portion of the barrier 100 illustrated in FIG. 1.

The casings 110, 120, 130 are positioned in substantially parallel rows to form respective arrays 111, 122 and 133, as shown in FIG. 1. The boreholes are drilled to a depth which, for containment applications, exceeds the depth of the containment volume within the Earth. Most preferably, boreholes within a single row are parallel, either vertical or at some preselected angle of incidence to the surface of the Earth. Different rows of boreholes can be drilled at different respective angles so that the axes of the boreholes of the respective outer arrays intersect along a line or at a point or be otherwise positioned, provided that the cold regions which extend radially about the casings in the boreholes intersect along a line or at a point within the Earth. By way of illustration, in FIG. 1, the axes of the respective sets of the axes $X_1$, $X_2$ and $X_3$ of the different arrays of boreholes each converge along a respective one of lines $L_1$, $L_2$, and $L_3$ associated with the respective sets within the Earth.

A first row 111 of casings 110 forms a first, or inner, array, and a second row 122 of casings 120 forms a second, or outer, array. A third row 133 of casings 130 is located between the first and second rows of casings and forms a third, or central, array. In the illustrated embodiment, the casings within an array are uniformly spaced apart at the surface region 105 by a distance d which can vary according to several factors, including, but not limited to, the ultimate width of the barrier, the ultimate volume of the containment region, the flow rate of the heat transfer medium within the casings, and the nature of the surrounding subsoil. At the surface region 105, the arrays of casings are typically spaced apart from other rows by a distance D which can also vary according to the above factors. It is preferred that the distance D between arrays of casings be substantially greater than the distance d between individual casings within an array.

Typical casings useful in the method of the invention are shown in FIGS. 2, 3, 4A and 4B. Such casings can be used to give structural strength to a borehole, thus preventing or reducing caving and shifting of the Earth around the borehole after it is drilled. They can also function as conduits for water and other liquids or slurries, or they can act as structural channels for the passage of pumps and other equipment to various locations within the borehole. The uses of casings for well drilling are known in the drilling industry and are not further detailed herein.

Figure 2:
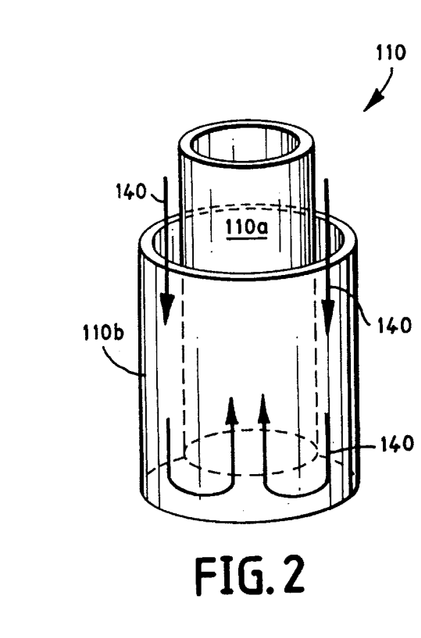
FIG. 2 is a schematic representation of a casing which can be used for establishing a flow of a heat transfer medium in the casings.
Figure 3:
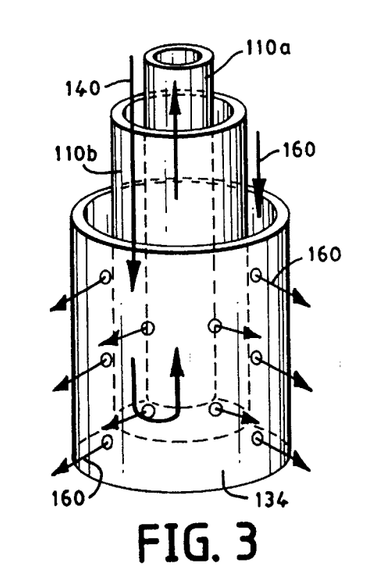
FIG. 3 is a schematic representation of still another embodiment of a casing which can be used both for the flow of a heat transfer medium and the introduction and withdrawal of water.
Figure 4A:
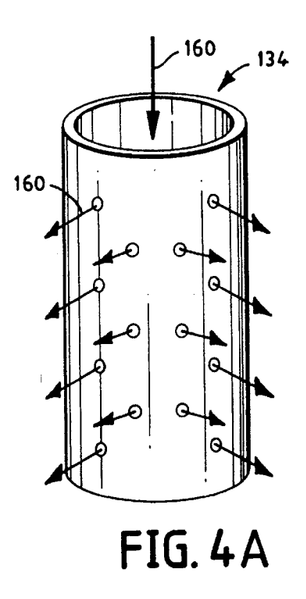
FIG. 4A is a schematic representation of a casing which can be used for the introduction of water into the third array of casings.
Figure 4B:
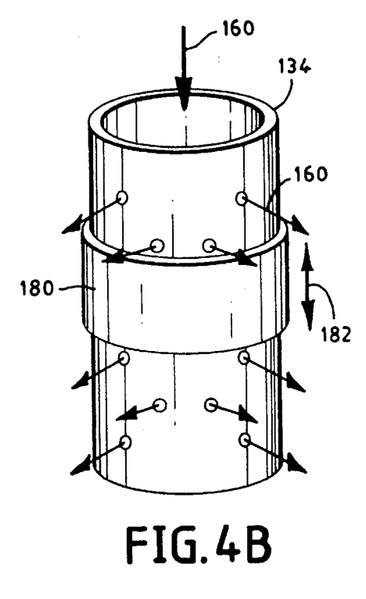
FIG. 4B is a schematic representation of an alternative embodiment of a casing for the introduction of water.

The casings used in the method of the invention can include, for example, multiple concentric conduits, such as are shown in FIGS. 2 and 3. They can also include single conduits, which can be solid, partially perforated, fully perforated as shown in FIG. 4A, or fully perforated with a solid collar, as shown in FIG. 4B. The single conduits can also be formed of solid and perforated sections.

In the multiple concentric conduit casing, shown in FIG. 2, a flow of a heat transfer medium, such as a refrigerant 140, can be established in one direction through an outer conduit 110b of the casing 110 and can return to a heat exchanger (not shown) through an inner conduit 110a, as indicated by the arrows in the Figures. The flow of refrigerant 140 through the outer conduit 110b of the casing 110 extracts heat from the subsoil immediately surrounding the casing, cooling the subsoil in the vicinity of the casing. The refrigerant 140 circulates back to a heat exchanger external to the casing to be rechilled before it is flowed once again through the outer conduit 110b of the casing.

The multiple conduit casing illustrated in FIG. 3 is similar to that in FIG. 2 but includes an outer perforated conduit and can be used to establish a flow of a heat transfer medium and/or to transport water to/from the barrier site.

According to the method of the invention, the inner and outer arrays 111, 122 of casings 110, 120 are the multiple conduit type. A flow of refrigerant 140 is established in the inner and outer arrays of casings 110, 120 to create cold columnar regions within the Earth. If there is sufficient naturally occurring moisture within the Earth to result in freezing of the Earth in the regions surrounding the cooled casings, ice columns, such as those described in U.S. Pat. No. 4,974,425 to Krieg et al., will form. If the subsoil surrounding the cooled casings is arid, it may not freeze but instead will be cooled to a temperature approaching that of the refrigerant flowing through the outer conduit of the casing, preferably to a temperature of less than zero degrees C. Those skilled in the art will be able to select a refrigerant and a flow rate to achieve and maintain a desired temperature through a predetermined volume in a particular type of subsoil.

The central array of casings 133 includes both the multiple conduit and the perforated conduit configurations. The perforated casing, illustrated in FIG. 4A, is useful when it is desired, for example, to introduce a liquid to, or withdraw a liquid from, the region surrounding the casing. The perforated casing can be constructed in sections, with perforated sections alternating with solid sections to effect a selective distribution of liquid to the region surrounding the casing. Alternatively, the perforated casing can be outfitted with one or more solid collar pieces 180, shown in FIG. 4B. These solid collars 180 can be moved axially along the casing, as shown by arrow 182, and fixed in a desired location on the casing, for selectively controlling the addition or withdrawal of water in selected regions around the casing.

According to the method of the invention, the central array of casings 133 performs dual functions. The central array of casings 133 includes conduits 132 for establishing a flow of a heat transfer medium, such as a refrigerant 140 or a heat transtar agent 150, and conduits 134 for the introduction of water 160 to the regions surrounding the central array of casings.

Figure 5:
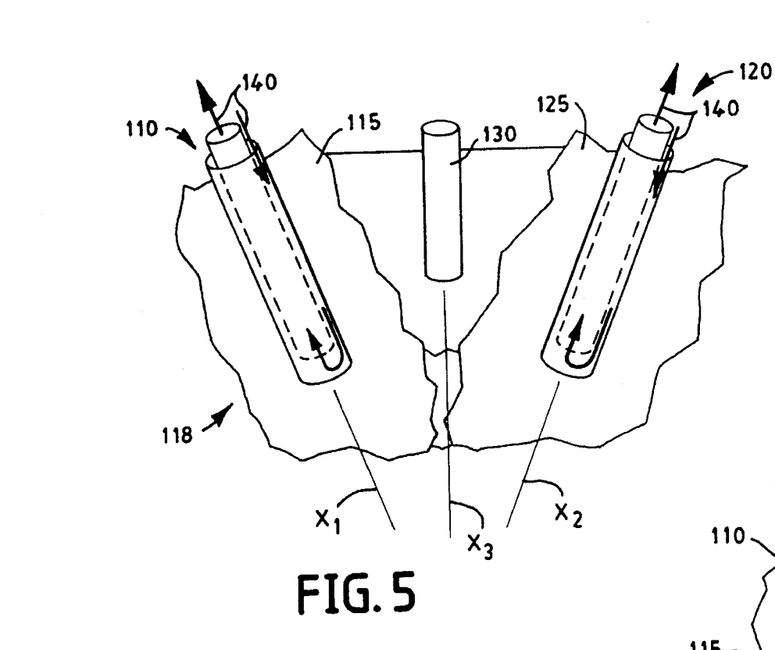
FIG. 5 is a side cross-sectional view of a cryogenic barrier constructed according to the method of the invention, in which a refrigerant flow is established in the first and second arrays of casings to create adjacent, overlapping cold columnar regions within the Earth.

Construction of the barrier according to the method of the invention is illustrated schematically in FIGS. 5–8. As shown in FIG. 5, inner, outer and central arrays of boreholes are drilled into the Earth along respective sets of central axes $X_1$, $X_2$ and $X_3$. The boreholes can be fitted with casings 110, 120 and 130, as previously described. A flow of refrigerant 140 is established in the inner and outer arrays of casings 111, 122. The refrigerant flow 140 cools the regions of the Earth surrounding the casings 110, 120, thereby creating cold columnar regions 115 and 125 extending axially along and radially about the respective central axes $X_1$ and $X_2$. The type of refrigerant selected, the flow rate of the refrigerant through the casings 110, 120, the density, composition and temperature of the subsoil surrounding the casings 110, 120, and the spacing between the casings 110, 120 are all factors which will affect the rate at which the cold columnar regions 115 and 125 are formed, and the size to which they will grow. It is preferred to space the arrays and to select a refrigerant and a flow rate which will cause adjacent cold columnar regions to overlap to form a continuous cold troughlike region 118, as shown in FIGS. 5, 6 and 12A–12D.

Trough-like region 118 of cold subsoil surrounds the inner and outer arrays of casings 110, 120. The central array of casings 133, which is located between the inner and outer arrays of casings 111,122, occupies the portion of the trough-like region which is between the cold columnar regions.

Figure 6:
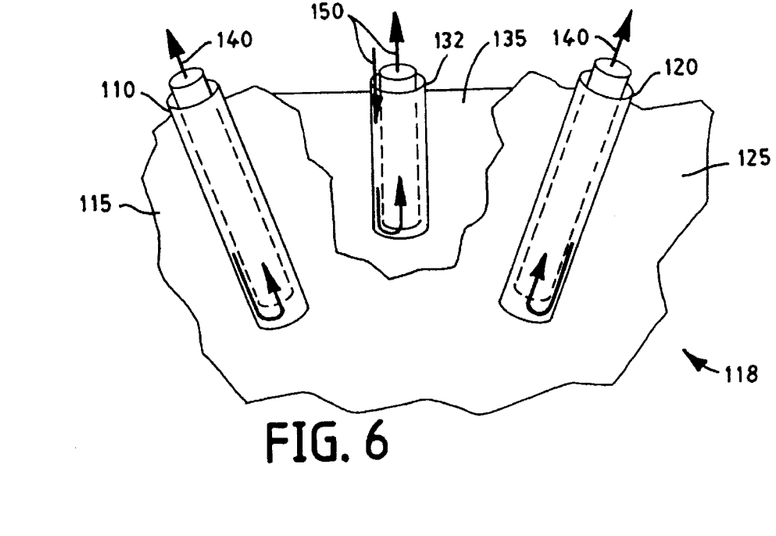
FIG. 6 is a side cross-sectional view of a cryogenic barrier constructed according to the method of the invention, in which a flow of a heat transfer agent is established in a first selected subset of casings in the third array of casings, to establish a continuous warm region between the first and second cold regions.

As shown in FIG. 6, a heat transfer agent 150 is introduced through selected casings 132 in the central array of casings 133 to warm the region of subsoil surrounding the central array of casings 133 to a temperature of greater than 0 degrees C. The flow of heat transfer agent 150 through casings 132 creates and maintains a continuous warm region 135 between the continuous cold regions 115, 125. A temperature gradient is established at the boundaries between the continuous warm region 135 and the continuous cold regions 115, 125. The heat transfer agent 150 and its flow rate are selected to maintain the temperature of the subsoil surrounding the central array of casings 133 at a temperature of greater than 0 degrees C.

Figure 7:
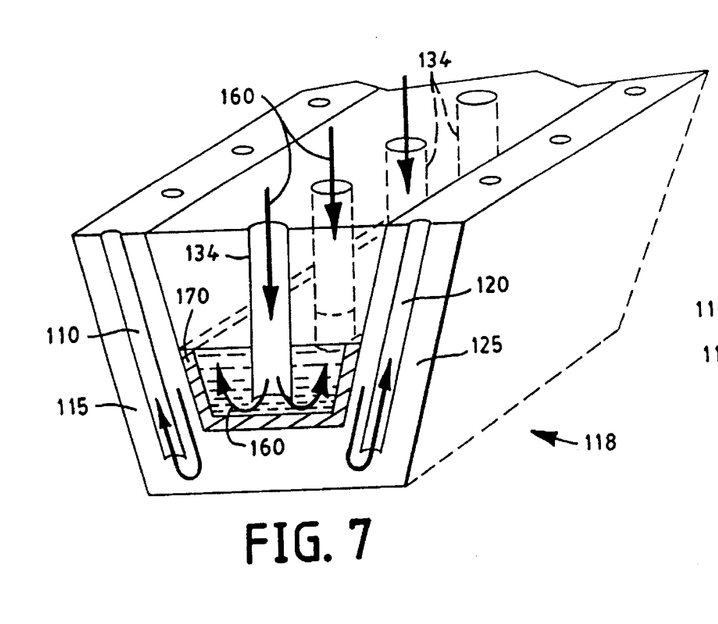
FIG. 7 is a perspective cross-sectional view of a cryogenic barrier constructed according to the method of the invention, in which water is introduced into the continuous warm region from the bottom through a second selected subset of casings in the third array of casings to saturate the continuous warm region with water.

FIG. 7 illustrates the next step in the construction of the barrier. The continuous cold region 118 is maintained by the appropriate flow of refrigerant 140 through casings 110, 120 in the inner and outer arrays. A flow of water 160 is then introduced into the continuous warm region 135 through a second selected subset of casings 134 in the central array of casings 133. The water 160 enters the continuous warm region 135 at the bottom of the region through perforated sections of the casings 134. The water 160 flows into the continuous warm region 135 at a rate which will ensure saturation of the continuous warm region 135 with minimum passage of the water 160 into and through the continuous troughlike cold region 118 adjacent to the continuous warm region 135. The water 160, upon contact with the boundaries of the continuous cold region 118, freezes to form an ice wall 170 at the boundaries between the continuous warm region 135 and the continuous cold region 118. As the water level in the continuous warm region 135 increases, more ice 170 is formed along the boundaries, until the region surrounding the central array of casings 133 is saturated with water. At saturation, no additional water can be added to the continuous warm region 135, and the flow of water 160 through casings 134 is stopped.

Figure 8:
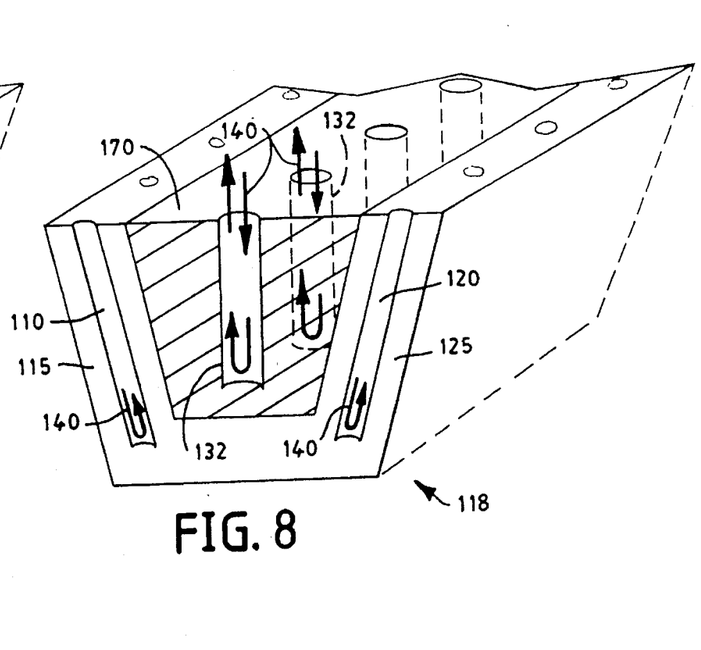
FIG. 8 is a perspective cross-sectional view of a cryogenic barrier constructed according to the method of the invention, in which the continuous warm region, now saturated with water, is cooled to a temperature of less than 0 degrees C. by a flow of refrigerant in the first selected subset of casings in the third array of casings.

As shown in FIG. 8, a refrigerant 140 is now flowed through casings 132 in the central array 133, which earlier contained a heat transfer agent 150 for maintaining the continuous warm region 135 at a temperature of greater than 0 degrees C. The refrigerant 140 flows through casings 132 and freezes the saturated subsoil in the continuous warm region 135 to create a nonporous, substantially liquid-impermeable barrier 100.

Figure 9:
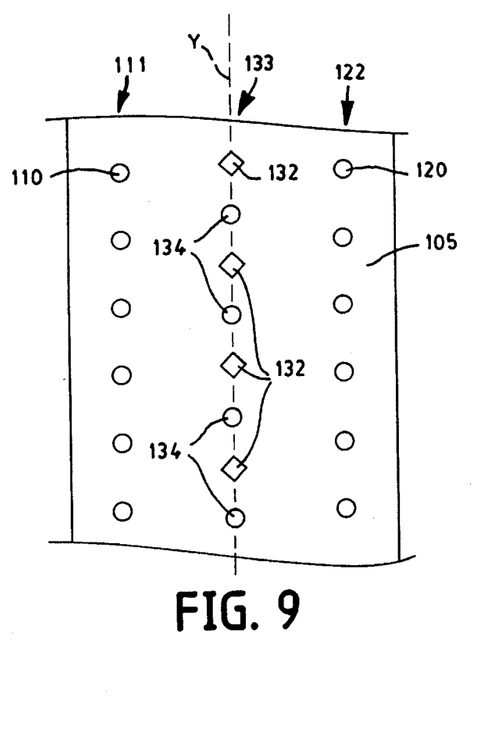
FIG. 9 is a plan view of a cryogenic barrier constructed according to the method of the invention, illustrating a preferred arrangement of casings in the three arrays.

FIG. 9 illustrates a preferred placement of heat transtar conduits 132 among the remaining casings 130 within the third array of casings 133. Preferably, the heat transfer conduits 132 are alternately spaced between the water flow conduits 134. Depending on factors which include the properties of the subsoil, the heat transtar agent selected, the flow rate of the heat transfer agent, and the temperatures of the surrounding continuous cold regions, other conduit placements within the third array 133 may be beneficial.

If complete containment of a volume within the Earth is desired, the cryogenic barrier surrounding the periphery of the volume must preferably form walls which converge along a predetermined line, as illustrated in FIG. 1, or at a predetermined point within the Earth. In addition, the respective pairs of the intersecting inner cold regions, outer cold regions and the central regions are contiguous, as shown in FIG. 1, to ensure complete integrity of the the frozen wall in the central region and to ensure that nothing from the volume enclosed by the frozen barrier structure can migrate through the frozen walls surrounding the containment volume during the construction of the containment structure and during its removal.

Figure 10A:
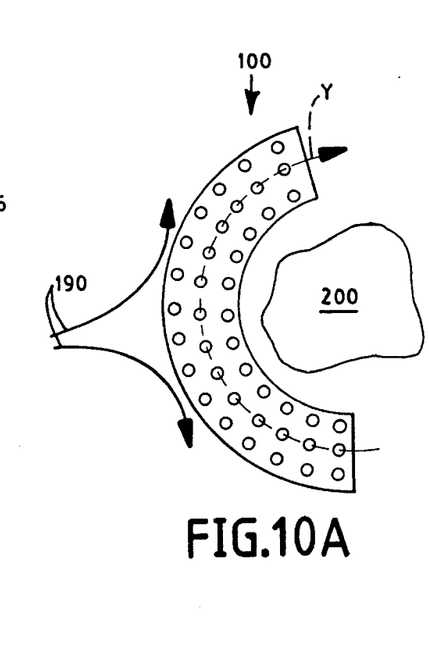
FIG. 10A is a plan view of one preferred embodiment of a cryogenic barrier constructed according to the method of the invention.
Figure 10B:
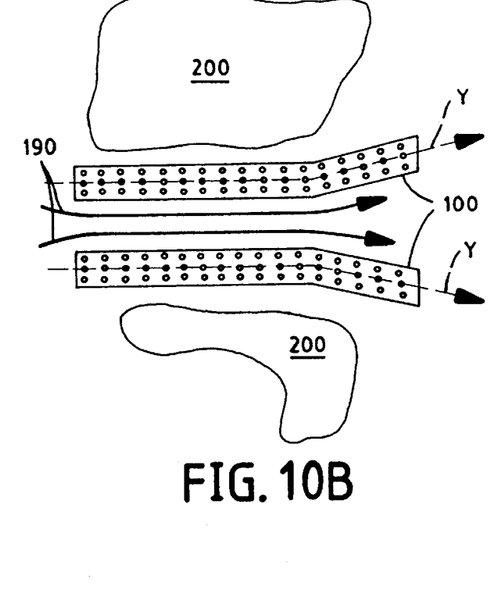
FIG. 10B is a plan view of another preferred embodiment of a cryogenic barrier constructed according to the method of the invention.
Figure 11A:
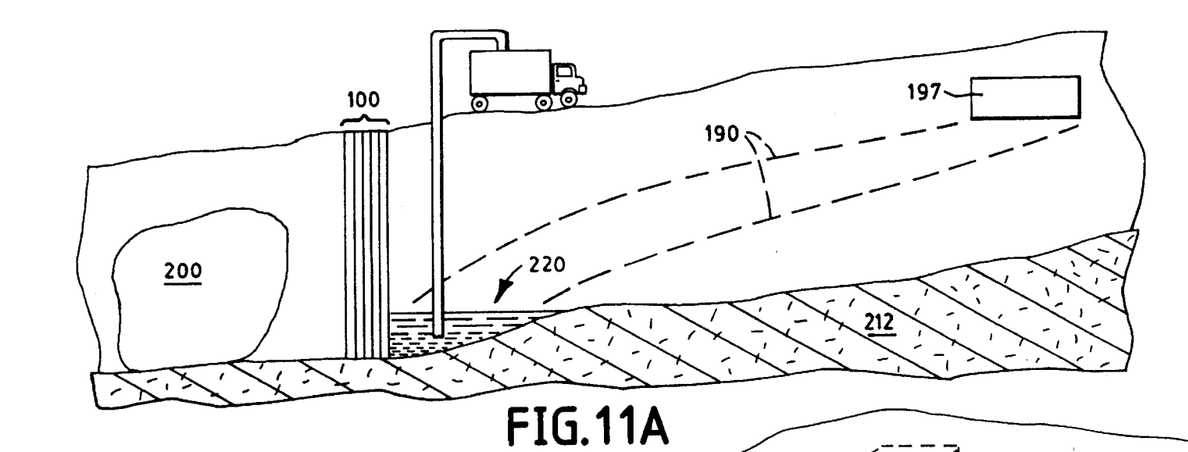
FIG. 11A is a cutaway cross-sectional representation of a fluid collection zone formed within the Earth from the intersection of a barrier wall constructed according to the method of the invention with a liquid-impervious layer within the Earth.
Figure 11B:
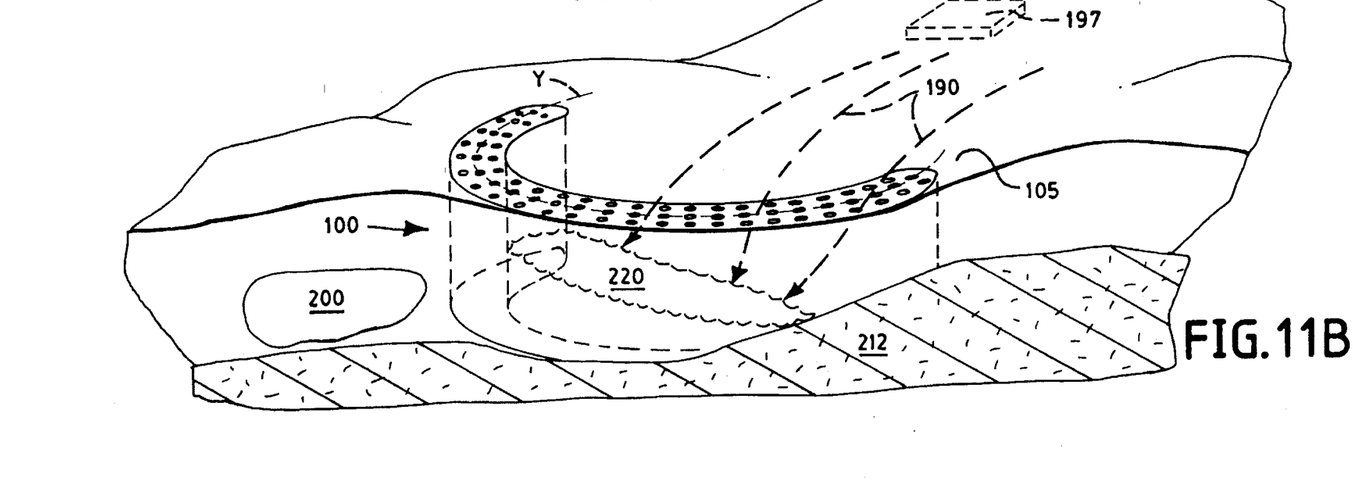
FIG. 11B is a perspective cross-sectional representation of a fluid collection zone formed within the Earth from the intersection of a different barrier wall construction with a liquid-impervious layer within the Earth.

The barrier 100 can be constructed as an enclosure for a volume, as illustrated in FIG. 1. Alternatively, the barrier 100 can be constructed as a subterranean wall or a channel, as illustrated in FIGS. 10A and 10B, for diverting migratory flows 190 around or between an environmentally protected area 200. In soils in which some naturally occurring moisture is present, the cryogenic barrier can also be constructed using a single or double array of casings, as disclosed in U.S. Patent 4,860,544 to Krieg et al. As shown in FIGS. 11A and 11B, such barriers can extend downward to, for example, a liquid-impervious layer 212 within the Earth to focus and direct the subterranean flow of migratory material to a collection zone 220, from which the collected fluid can be removed, such as by pumping to an appropriate containment or transportation facility.

In FIG. 11A a subterranean source 197 of hazardous materials or environmental contaminants is located at a higher subterranean elevation than a region to be protected from contamination, illustrated as aquifer 200. Subterranean migratory fluid streams 190 overlie a liquid-impervious layer 212. The subterranean streams 190 flow generally along substrata which generally follow the contours of the surface region of the Earth 105. A barrier wall 100 constructed according to the methods of the invention can be located such that the central axes of the arrays of casings, and thus of the cold and frozen regions, intersect with the liquid-impervious layer, thereby forming a collection zone 220 at the intersection of the barrier wall 100 and the liquid-impervious layer 212. The migratory fluid streams 190, which may contain contaminants leached from the hazardous materials site 197, flow along the substrata and are collected and concentrated in the collection zone 220. From there the contaminated fluids may be removed from the Earth, such as by pumping, and transported to another site for decontamination.

FIG. 11B illustrates a different barrier configuration for a subterranean collection zone, in which the barrier 100 extends along a curvilinear axis Y' on the surface region of the Earth 105. As in FIG. 11A, migratory streams 190 flow generally downstream from a subterranean source of contaminants 197 and are collected in a collection zone 220 formed at the intersection of the barrier wall 100 and the liquid-impervious stratum 212. The region to be protected from environmental contaminants, illustrated as aquifer 200, is thus isolated from the contaminated migratory streams 190 and the collected fluids in the collection zone 220.

Figure 12A:
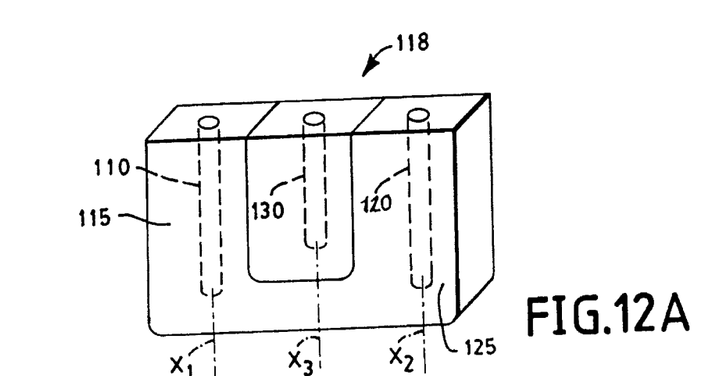
FIGS. 12A–12D are cross-sectional views of various borehole/casing configurations and the cold regions which result from such configurations.
Figure 12B:
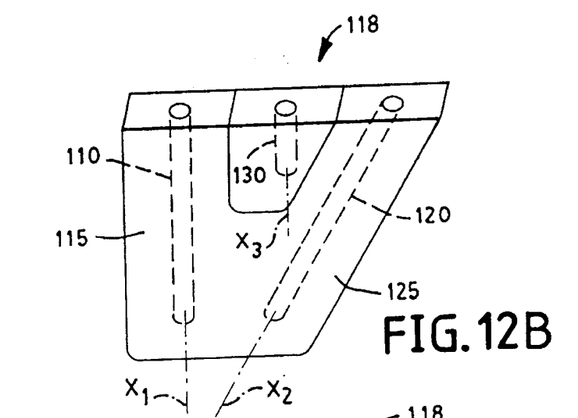

FIGS. 12A–12D illustrate various borehole/casing configurations which result in the establishment of a continuous cold region 118 within the Earth. In FIG. 12A, the arrays of boreholes are parallel and extend vertically into the Earth along respective sets of central axes $X_1$, $X_2$ and $X_3$. The inner and outer arrays of boreholes 111,122 are drilled to a preselected depth, whereas the central array of boreholes 133 is drilled to a shallower depth. The difference in depths of the respective boreholes arrays should be sufficiently great so that a continuous cold region 118 can be established around the inner and outer arrays of boreholes and beneath the end of the central array of boreholes 133 by controlling the flow of refrigerant through the inner and outer arrays of boreholes, particularly in the bottom portions of the inner and outer arrays of boreholes 111,122 which extend beyond the bottom portion of the central array of boreholes 133.

in FIG. 12B, the first or inner array of boreholes 111 is established vertically into the Earth along a set of central axes $X_1$. The second or outer array of boreholes 122 is established at an angle with respect to the inner array along a set of central axes $X_2$. The third or central array of boreholes 133 is established vertically between the inner and outer arrays along a set of central axes $X_3$. The central set of axes $X_3$ need not necessarily converge with axes $X_1$ and $X_2$, provided that the inner and outer arrays of boreholes 111,122 establish the desired cold regions surrounding a relatively warm region established around the central array of boreholes 133.

Figure 12C:
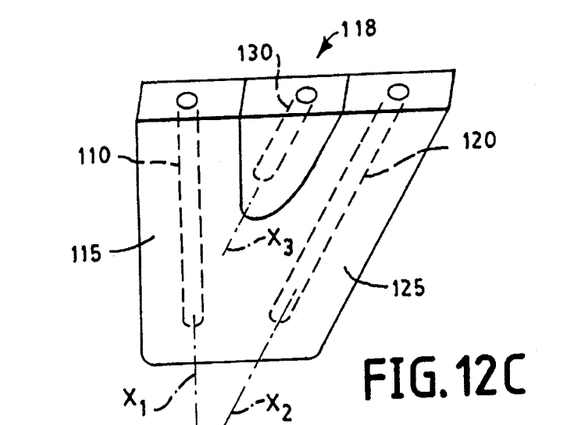

In FIG. 12C the configuration of the arrays of boreholes 111,122, 133 is identical to that illustrated in FIG. 12A, except that the central array of boreholes 133 extends along a set of central axes $X_3$ which are substantially parallel to the axes $X_2$ of the outer array of boreholes 122. Orientation of the central axes $X_3$ of the central array of boreholes 133 is not critical to the operation of the invention, provided that a continuous, relatively warm region can be established between a continuous cold region surrounding the inner and outer arrays of boreholes.

Figure 12D:
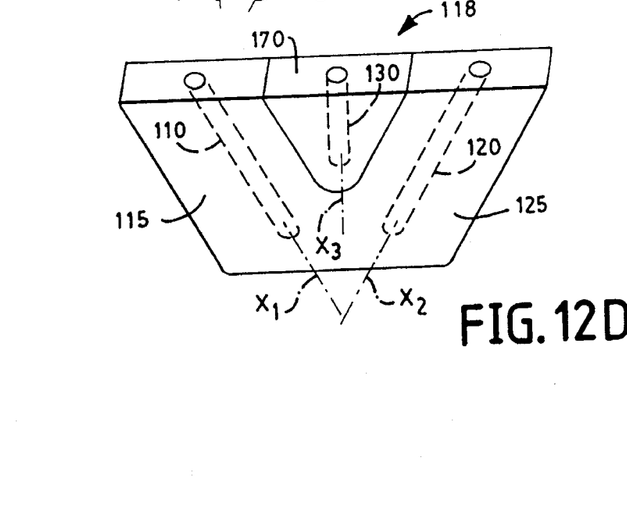

In FIG. 12D the inner and outer arrays 111 and 122 are angled toward each other with axes $X_1$ and $X_2$ converging at a predetermined point within the Earth. The central array 133 extends vertically into the Earth with central axis $X_3$ intersecting with central axes $X_1$ and $X_2$ of the inner and outer arrays.

The barrier 100 is maintained at a temperature of less than 0 degrees C. by continued circulation of refrigerant 140 through at least a portion of the casings 110, 120 and 132. Maintenance of the barrier 100 at a desired temperature is considerably less expensive than the initial establishment of the barrier and may require circulation of less refrigerant and/or a reduced flow rate.

A cryogenic barrier 100 constructed according to the method of the invention can be removed from within the Earth to restore the barrier site to its original condition. This reversibility of construction is an important feature of the invention, particularly in environmentally remediated areas. Toxic materials can be temporarily stored within a cryogenic containment system constructed according to the method of the present invention and can later be removed from the storage system using known remediation or removal methods. Once the stored materials have been removed from the site, the need for a cryogenic barrier may no longer exist. The barrier 100 can be removed by selectively thawing frozen sections of the subsoil surrounding the central array of casings, and collecting the moisture from the thawed subsoil. Any water which was added to the subsoil to establish the cryogenic barrier can be substantially contained and removed to leave the site in its original condition and at its original moisture level.

Removal of the barrier 100 from within the Earth can be accomplished as follows: First, the maintenance flow of refrigerant 140 in the casings 132 of the central array 133 is ceased and is replaced with a flow of a heat transfer agent 150. The heat transfer agent 150 thaws the frozen subsoil in the barrier 100 as it warms the subsoil to a temperature in excess of 0 degrees C. The thawing process produces moisture which accumulates at the bottom of the barrier 100 and which can be withdrawn from the subsoil surrounding the central array of casings 133 via the perforated casings 134, into which pumps or other liquid withdrawal devices (not shown) can be dropped.

A barrier constructed according to the method of the present invention provides numerous advantages over previous cryogenic barrier designs. The ability to establish, alternatively and selectively, a frozen region and a relatively warm region between two planar continuous cold regions permits great flexibility in the placement, creation, maintenance, repair and removal of the barrier. It further permits selective freezing and thawing of the barrier at selected locations and/or in a selected sequence of operations. Such selectivity can be useful, for example, in channeling or diverting stored material through, between or around barriers, creating "cells" of different stored materials within a containment system, and establishing a rotation system whereby stored material can be transported between cells within the containment system.

Moreover, environmental legislation imposes increasingly stringent requirements for the implementation of containment systems having minimal environmental impact. The cryogenic barrier of the present invention can be installed, for example, in arid soils by adding controlled amounts of water to a controlled region and freezing the water in the region. Once a containment site has been remediated and containment of toxic or other materials is no longer required, the barrier can be removed by thawing the frozen region and withdrawing the added water from the thawed region to restore the region to its original condition. The amount of water added to the region during installation of the barrier can be precisely measured and its migration within the barrier controlled so that it can be substantially removed without affecting the environment at the barrier site.

Testing of the barrier for structural integrity and impermeability can also be accomplished conveniently using the design of the present invention. The ability to selectively freeze and liquefy portions of the barrier provides an important inspection tool. The capillary action of liquid circulating within sections of the frozen barrier region can be used, for example, to detect cracks or faults in the barrier. Such faults can then be remedied by the addition of water to the affected area and the selective freezing of the added water, or by selective thaw-annealing of the affected region. Porosity of the barrier or any portion of the barrier can also be determined by thawing selected regions of the barrier, removing the resultant moisture from that region, and introducing a gas, such as carbon dioxide, into the thawed region. The pressure of the introduced gas can be monitored to determine the permeability of the barrier at any location.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method for reversibly establishing a nonporous, substantially liquid-impermeable cryogenic barrier extending downward from an elongated surface region of the Earth, said surface region having an axis extending along the long dimension of the surface region, comprising the steps of:

A. establishing a first array of casings extending downward along a first set of central axes from a corresponding first set of spaced apart locations on said surface region, the first set of locations being generally parallel to the axis of said elongated surface region, B. establishing a second array of casings extending downward along a second set of central axes from a corresponding second set of spaced apart locations on said surface region, said second set of locations being substantially parallel to and spaced apart from said first set of locations, C. establishing a third array of casings extending downward along a third set of central axes from a corresponding third set of spaced apart locations on said surface region, said third set of locations being between said first and second sets of locations and said third array of casings being between said first and second arrays of casings, and further comprising the sequential steps of:

A. establishing a flow of heat exchange medium in said casings, including the substeps of:
  i. establishing a flow of refrigerant in the first and second arrays of casings to cool the first and second arrays of casings to a temperature of less than 0 degrees C. to establish cold columnar regions in the Earth extending axially along and radially about the first and second sets of central axes, wherein the refrigerant flow and the positions of the first and second arrays of casings are selected so that adjacent cold columnar regions in respective arrays overlap to establish corresponding first and second continuous cold regions having a temperature of less than 0 degrees C., said first and second cold regions being opposite each other and disposed on respective sides of said third array of casings, and
  ii. establishing a flow of a heat transtar agent in a first selected subset of said third array of casings, whereby regions of the Earth surrounding said third array of casings are at a temperature in excess of 0 degrees C. to establish warm columnar regions in the Earth extending axially along and radially about the third set of central axes, wherein the flow of said heat transfer agent and the positions of the third array of casings and of the first selected subset of said third array of casings are selected so that adjacent warm columnar regions in the third array overlap to establish a corresponding continuous warm region extending between said first and second continuous cold regions, B. introducing water into a second selected subset of said third array of casings, wherein at least a portion of the water enters said first and second continuous cold regions and freezes therein to establish frozen regions on respective sides of said continuous warm region, wherein sufficient water is introduced to saturate said continuous warm region with water, and C. establishing a flow of refrigerant in said first selected subset of said third array of casings, whereby unfrozen water in the continuous warm region freezes to form a nonporous, substantially liquid-impermeable barrier.

2. The method according to claim 1 wherein the spacing D between said said arrays of casings is substantially greater than the spacing d between individual casings in any given array.

3. The method according to claim 1 wherein said first, second and third sets of central axes $X_1$, $X_2$ and $X_3$ converge at a predetermined point within the Earth.

4. The method according to claim 1 wherein said cryogenic barrier forms a closed container beneath said surface region of the Earth.

5. The method according to claim 1 wherein said cryogenic barrier forms an open barrier beneath said surface region of the Earth.

6. The method according to claim 1 wherein said casings further include means for removing water from the subsoil surrounding said casings.

7. The method according to claim 1 wherein individual casings in said first selected subset of said third array of casings are evenly spaced between individual casings in said second selected subset of said third array of casings.

8. The method according to claim 1 wherein said axis of said elongated surface region comprises a closed axis, and wherein said cold regions extending about said first and second arrays of casings intersect within the Earth to provide an enclosed region interior to said first and second sets of spaced apart locations on said surface region.

9. The method according to claim 1 wherein said cold regions extend downward to a liquid-impervious layer within the Earth.

10. The method according to claim 9 wherein said liquid-impervious layer near said cold regions is other than perpendicular to the direction of the local force of gravity on the Earth, and wherein said cold regions intersect said liquid-impervious layer, thereby forming a collection zone, and further comprising the step of removing collected liquids from said collection zone.

11. A nonporous, substantially liquid-impermeable cryogenic barrier extending downward from an elongated surface region of the Earth, said surface region having an axis extending along the long dimension of the surface region, comprising:

A. a first continuous cold region extending downward from a corresponding first set of spaced apart locations on said surface region, the first set of locations being generally parallel to the axis of said elongated surface region, B. a second continuous cold region extending downward from a corresponding second set of spaced apart locations on said surface region, said second set of locations being substantially parallel to and spaced apart from said first set of locations, C. an intermediate region extending downward from a corresponding third set of spaced apart locations on said surface region, said third set of locations being between said first and second sets of locations, said intermediate region extending between said first and second continuous cold regions, wherein at least a portion of said first and second continuous cold regions overlap, said first and second continuous cold regions being opposite each other and disposed on respective sides of said intermediate region, wherein said first and second continuous cold regions further include means for establishing a flow of a refrigerant therein to cool said first and second continuous cold regions to a temperature of less than zero degrees C., such that the first and second continuous cold regions are sufficiently cold to freeze any liquids present therein, wherein said intermediate region further includes:
  i) means for establishing a flow of a heat transtar agent in first selected portions of said intermediate region to warm said intermediate region of the Earth to a temperature in excess of 0 degrees C. to create a continuous warm region extending between said first and second continuous cold regions, ii) means for establishing a flow of water in second selected portions of said intermediate region, wherein at least a portion of the water enters said first and second continuous cold regions and freezes therein to establish frozen regions on respective sides of said continuous warm region, wherein sufficient water is introduced to saturate said continuous warm region with water, and iii) means for establishing a flow of a refrigerant in said water-saturated continuous warm region to cool said water-saturated continuous warm region to a temperature of less than zero degrees C. to freeze said water therein, thereby creating a nonporous, substantially liquid-impermeable cryogenic barrier.

12. A cryogenic barrier in accordance with claim 11 wherein said means for establishing a flow of a refrigerant in said first and second continuous cold regions comprises respective first and second arrays of casings extending downward along respective first and second sets of central axes from said corresponding first and second sets of spaced apart locations on said surface region of the Earth.

13. A cryogenic barrier in accordance with claim 11 wherein said means for establishing a flow of a heat transfer agent in said first selected portions of said intermediate region comprises a first selected subset of a third array of casings extending downward, along a corresponding third set of central axes from said third set of spaced apart locations on said surface region of the Earth.

14. A cryogenic barrier in accordance with claim 11 wherein said means for establishing a flow of water in said second selected portions of said intermediate region comprises a second selected subset of said third array of casings extending downward along said corresponding third set of central axes from said third set of spaced apart locations on said surface region of the Earth.

15. A cryogenic barrier in accordance with claim 11 wherein said heat transfer agent is a refrigerant.

16. A cryogenic barrier in accordance with claim 11 wherein said heat transfer agent is a heat exchange medium.

17. The cryogenic barrier according to claim 11 wherein said axis of said elongated surface region comprises a closed axis, and wherein said cold regions extending about said first and second arrays of casings intersect within the Earth to provide an enclosed region interior to said first and second sets of spaced apart locations on said surface region.

18. The cryogenic barrier according to claim 11 wherein said cold regions extend downward to a liquid-impervious layer within the Earth.

19. The cryogenic barrier according to claim 18 wherein said liquid-impervious layer is disposed along an axis which is not perpendicular to the direction of the local force of gravity on the Earth, and wherein said cold regions are disposed in relation to said liquid-impervious layer to define a collection zone adjacent to said liquid-impervious layer.

* * * * *